Oct. 28, 1952 P. R. HOOPES ET AL 2,615,556
APPARATUS FOR ORIENTING AND ALIGNING CYLINDRICAL-SHAPED ARTICLES
Filed Sept. 11, 1945 4 Sheets-Sheet 1

INVENTORS
Penrose R. Hoopes
BY Dunmar C. Froelich
E. O. Flaander
their ATTORNEY

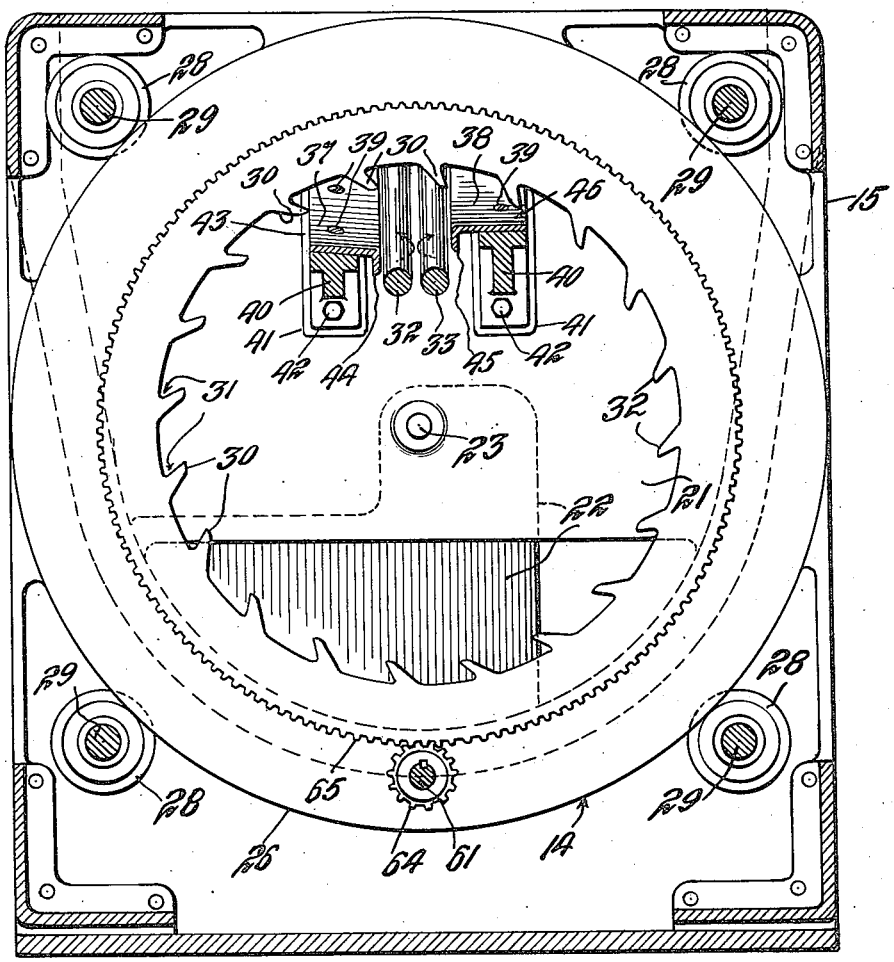
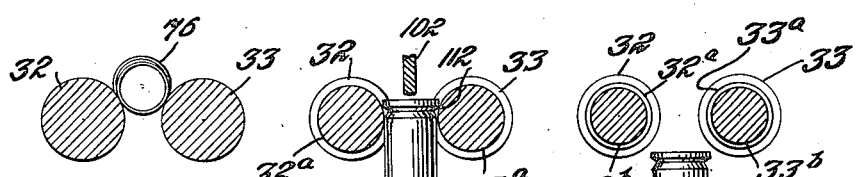
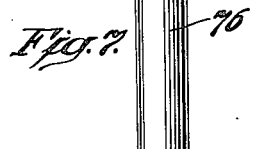
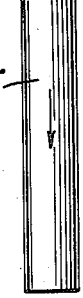

INVENTORS
Penrose R. Hoopes
Gunnar C. Froelich
BY
Their ATTORNEY

Oct. 28, 1952  P. R. HOOPES ET AL  2,615,556
APPARATUS FOR ORIENTING AND ALIGNING CYLINDRICAL-SHAPED ARTICLES
Filed Sept. 11, 1945  4 Sheets-Sheet 4
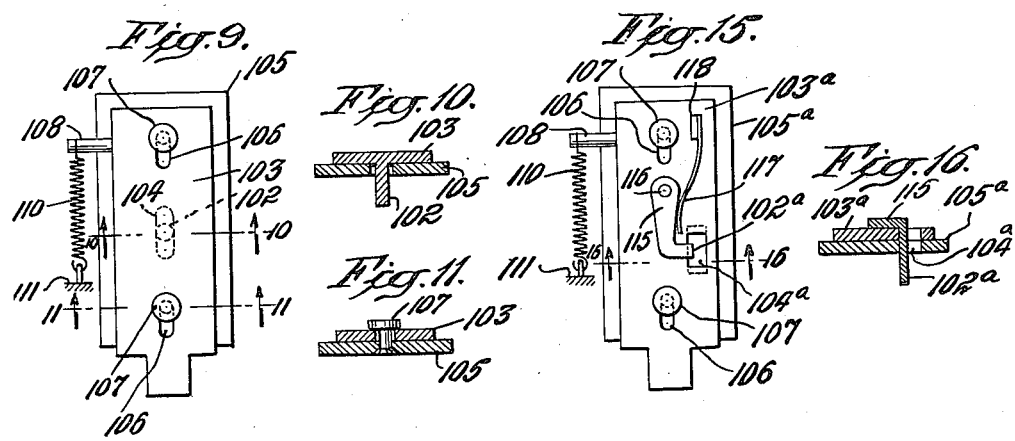
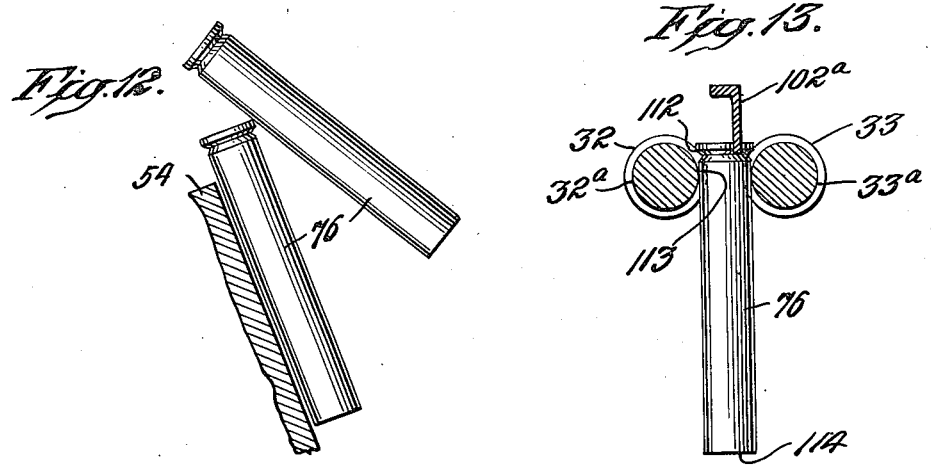
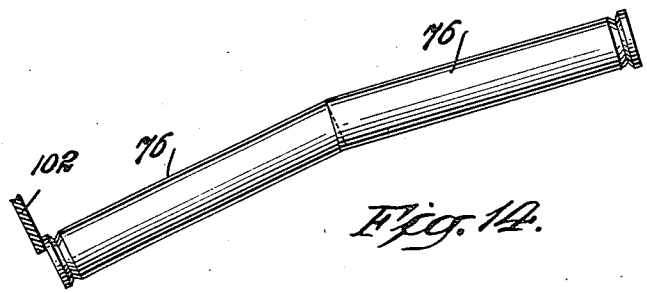
INVENTORS
Penrose R. Hoopes
Gunner C. Froelich
BY
ATTORNEY Patented Oct. 28, 1952

2,615,556

UNITED STATES PATENT OFFICE 2,615,556

APPARATUS FOR ORIENTING AND ALIGNING CYLINDRICAL-SHAPED ARTICLES

Penrose R. Hoopes and Gunnar C. Froelich, Philadelphia, Pa., assignors to Selas Corporation of America, Philadelphia, Pa., a corporation of Pennsylvania Application September 11, 1945, Serial No. 615,564

5 Claims. (Cl. 198—33)

Our invention relates to apparatus for handling articles, such as elongated or tapered articles which are round or of cylindrical shape, for example, and more particularly to such apparatus for feeding articles of this kind from a bulk supply in which they are haphazardly stored to arrange them in end to end relation in an orderly sequence.

It is an object of our invention to provide improvements in apparatus of this type to speed up the handling of the articles and increase the rate at which the articles are caused to assume an orderly and uniform arrangement.

The novel features which we believe to be characteristic of our invention are set forth with particularity in the claims. The invention, both as to organization and method, together with the above and other objects and advantages thereof, will be better understood by reference to the following description taken in connection with the accompanying drawings forming a part of our specification, and of which:

Fig. 2 is an enlarged transverse vertical sectional view taken at line 2—2 of Fig. 1;

Figs. 6, 7 and 8 are fragmentary sectional views taken at different points along the inclined spaced apart rollers to illustrate the different positions the articles assume as they move down the track;

Fig. 9 is a fragmentary plan view diagrammatically illustrating a movable stop associated with the inclined track and operating mechanism therefrom to prevent jamming of articles and insure proper orientation thereof before being released into the chute;

Figure 1:
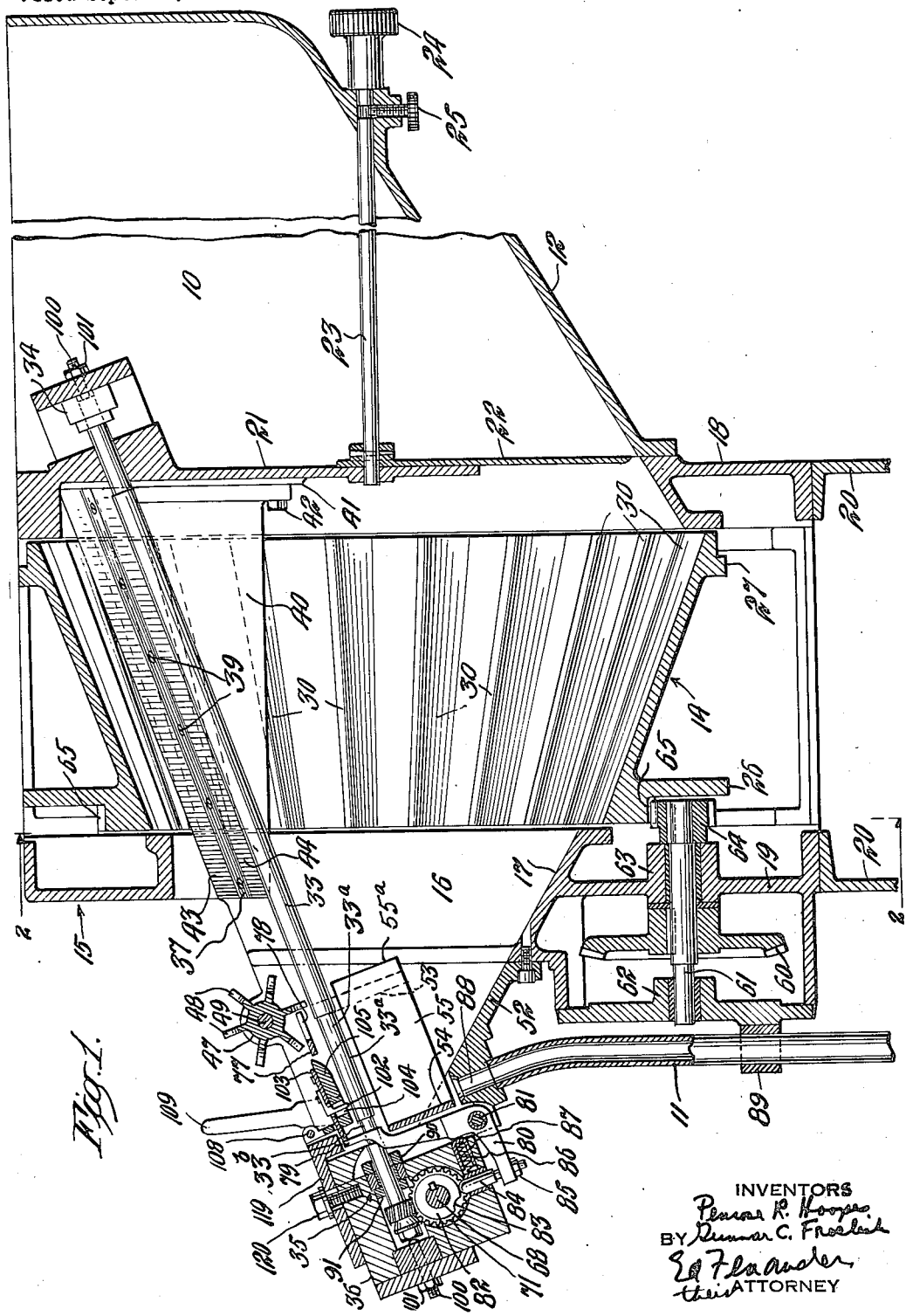
Fig. 1 is a side vertical sectional view of apparatus embodying our invention for feeding articles from a bulk supply to arrange them in orderly end to end relation.

Figs. 10 and 11 are sectional views taken at lines 10—10 and 11—11, respectively, of Fig. 9;

Fig. 12 is a fragmentary view more or less diagrammatically illustrating the manner in which a downward component of force is imparted to articles when released from the inclined track and about to enter the chute;

Fig. 13 is a fragmentary view similar to Fig. 7 illustrating a modified stop arrangement;

Fig. 14 is a fragmentary view diagrammatically illustrating a jammed condition of articles which the stops of Figs. 9 to 11 and Fig. 13 overcome;

Fig. 15 is a fragmentary plan view similar to Fig. 9 diagrammatically illustrating another form of mechanism associated with the modified stop of Fig. 13; and Fig. 16 is a sectional view taken at line 16—16 of Fig. 15.

In the drawings illustrating a preferred embodiment of the invention, apparatus is shown for rapidly feeding elongated hollow articles closed at one end, such as cartridge cases, for example, from a bulk supply in a hopper 10 to a vertical tube or chute 11 through which the articles pass downwardly by gravity in end to end relation, the articles being oriented in handling whereby all of the articles pass through the chute with their open ends pointed down.

The open hopper 10, in which the articles are deposited, is formed with a bottom 12 which slopes downwardly to one side of a rotatable hollow feed drum 14. The hopper 10 forms part of a casing 15 including a funnel or trough 16 having a bottom 17 which slopes downwardly to the opposite side of the feed drum 14. The bottoms 12 and 17 of the hopper 10 and the trough 16, respectively, are provided with downwardly extending wall parts 18 and 19, respectively, for supporting the casing 15 on suitable framework comprising a pair of angle members 20.

As shown most clearly in Fig. 1, the open hopper 10 is defined by a transverse vertical wall 21 of the shell 15 which is adjacent to the feed drum 14 and terminates above the bottom 12 of the hopper. A plate 22 fixed to a shaft 23 and of the shape shown in Fig. 2 projects downwardly from the wall 21 to the bottom 12 of the hopper. The shaft 23 may be rotated by a control knob 24 at the exterior of the hopper 10 to adjust the angular position of the plate 22 and hence control the size of the gap beneath the wall 21 through which the articles move downwardly by gravity from the hopper 10 into the feed drum 14. A set screw 25 is provided for the shaft 23 to lock the plate 22 in any position to which it is adjusted.

The open-ended feed drum 14 is rotatably supported within the casing 15 between the hopper 10 and trough 16 and receives the articles from the hopper in the bottom part thereof. To rotatably support the feed drum 14 the latter is provided with two spaced apart outwardly extending annular shoulders or rings 26 and 27, each of which receives the flanged rims of four rollers 28 spaced equidistant apart and loosely fixed to shafts 29 supported at their ends within the casing in any suitable manner (not shown).

The feed drum 14 is of frusto-conical shape and arranged in the casing 15 to provide a receptacle for receiving the articles. The wall of drum 14 slopes upwardly from the bottom 12 of the hopper 10 and terminates at its upper end adjacent to the bottom 17 of the trough 16, as best shown in Fig. 1. The hollow feed drum 14 is formed with a plurality of spaced apart internal ribs 30 extending axially therethrough. As best shown in Fig. 2, the ribs 30 are inclined in the direction of movement of the drum 14 to form grooves 31 whereby each groove during upward movement thereof picks up a number of articles from the mass or body of articles tumbling about in the bottom part of the drum.

The articles roll from the grooves 31 as the latter reach the top part of the casing 15 at which region some of the articles cascading downwardly in the upper part of the feed drum 14 fall in a lengthwise position between a pair of spaced apart rotatable rods or rollers 32 and 33, as shown in Fig. 6, the rollers forming a track extending through the drum. As best shown in Figs. 1 and 2, the rods or rollers 32 and 33 are parallel and slope downwardly from the hopper wall 21 to the chute 11 and are journaled at their ends at 34 and 35 at the wall 21 and in a housing 36, respectively, the latter being fixed to the end of the casing 15 at which the trough 16 is located.

When the rollers 32 and 33 are viewed from the end of the apparatus at which the chute 11 is located, as seen in Fig. 2, the roller 32 is adapted to turn in a counter-clockwise direction and the roller 33 is adapted to turn in a clockwise direction. Due to the rotation of the inclined rollers 32 and 33, a turning movement is imparted to the articles falling in lengthwise positions between the rollers to facilitate downward movement thereof toward the chute 11.

In order that the maximum number of articles will fall between the rollers 32 and 33 in end to end relation so that a continuous procession of articles will move down the rollers in abutting relation, guide plates 37 and 38 are provided closely adjacent to the rollers. The guide plates 37 and 38 are removably secured by screws 39 to brackets 40 which are T-shaped in transverse section and form inclined ramps each of which extends lengthwise of the rollers 32 and 33 and through the feed drum 14. The small free ends of the brackets 40 project into the trough 16 and the opposite larger ends thereof are formed with base plates 41 adapted to be secured to the transverse vertical wall 22, as by removable connections including the bolts 42 seen in Figs. 1 and 2.

As best shown in Fig. 2, the guide plate 37 at the side of the feed drum 14 at which the ribs 30 are adapted to move upwardly, is L-shaped in transverse section and arranged alongside the inclined roller 32. The long arm of guide plate 37 slopes downwardly from a gap 43 through which the ribs 30 pass to a region closely adjacent to the roller 32 at approximately the same level as the top of the latter, so that articles striking the guide plate 37 can readily pass over the roller 32 into the gap or space between the rollers 32 and 33. The short arm 44 at the lower edge of the guide plate 37 extends downwardly and is closely adjacent to the roller 32 to prevent articles from falling between the latter and the guide plate.

The guide plate 38 is L-shaped in transverse section and disposed lengthwise of and alongside the inclined roller 33. At any given longitudinal point along the track formed by the rollers 32 and 33, the guide plate 38 is at a higher level than the guide plate 37 and the longer arm thereof fixed to the T-shaped bracket 40 is more or less horizontally disposed. A vertically extending arm 45 of guide plate 38 projects upwardly from a region closely adjacent to the outer edge of roller 33 and serves to direct into the gap or space between the rollers 32 and 33 the articles striking the guide plate 38 and falling therefrom between the rollers. In order to prevent jamming of articles in the space above the guide plate 38 as the ribs 30 move downwardly therefrom during rotation of the feed drum 14, a gap or opening 46 is provided between the guide plate 38 and the drum 14 through which articles can pass.

During rotation of the feed drum 14 articles are continuously cascading from the grooves 31 into the partially enclosed space above the guide plates 37 and 38. These articles jolt and bounce on the guide plates, and, even though a considerable number fall down the guide plates into the trough 16 and find their way back into the bottom of the feed drum 14, a high percentage pass into the space between the rollers 32 and 33 and rest therebetween in lengthwise positions. Due to turning of the inclined rollers 32 and 33, a downward movement is imparted to the articles on the sloping track toward a clearing wheel 47.

Figure 3:
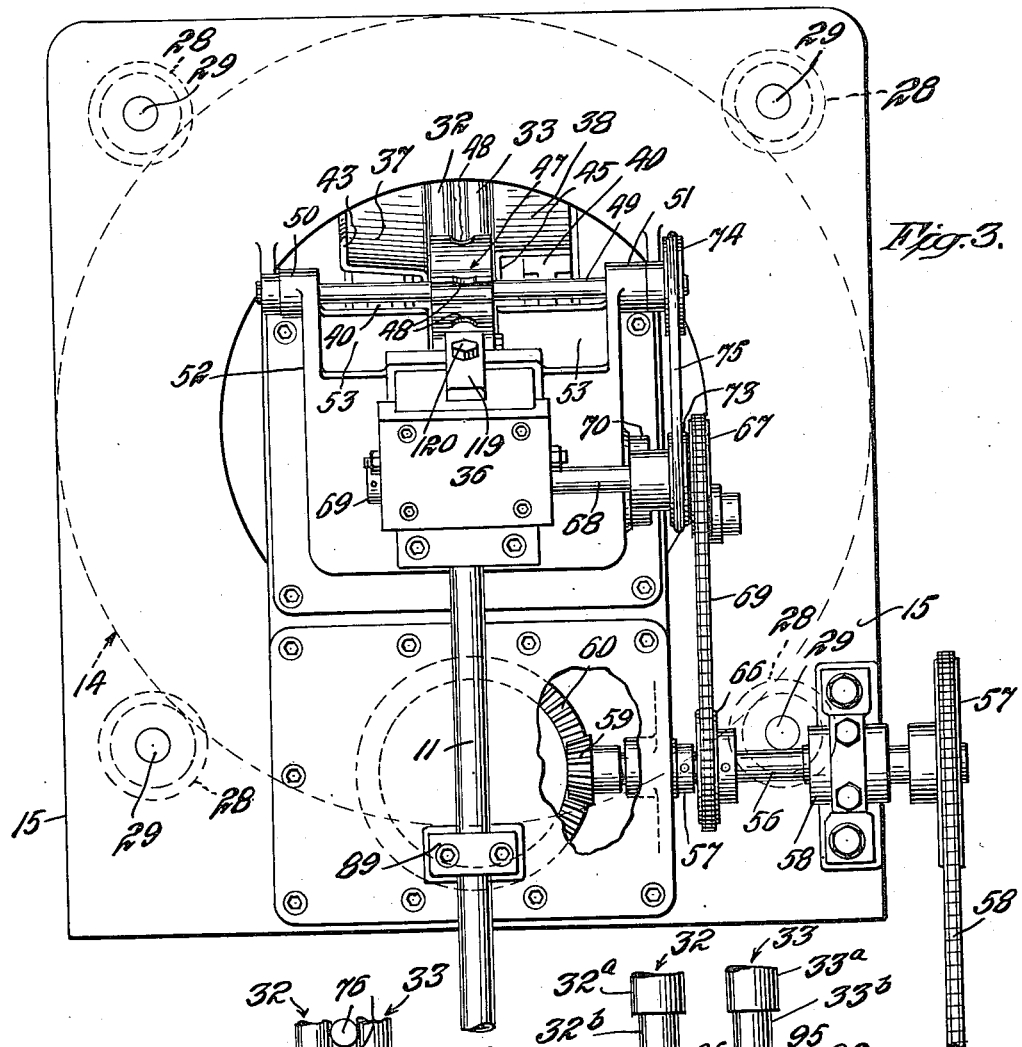
Fig. 3 is a front view of the apparatus of Figs. 1 and 2, partly broken away and in section, to illustrate the driving mechanism adjacent the vertical tube or chute through which the articles pass downwardly in end to end relation in orderly sequence.

As best shown in Figs. 1 and 3, the clearing wheel 47 is provided with a number of radial blades or vanes having notches 48 at the outer edges thereof. The clearing wheel 47 is fixed to a shaft 49 journaled at 50 and 51 to a U-shaped shell 52 forming a part of the casing 15 and defining the upper narrow part of the trough 16. The trough 16 is formed with side walls 53 at each side of the clearing wheel 47 which extend downwardly from a region immediately beneath the shaft 49 and terminate some distance from the bottom 17 of trough 16, as best shown in Figs. 1 and 3. The gap between the side walls 53 beneath the rollers 32 and 33 is taken up by the narrow open end of a vertically disposed U-shaped guide bracket 55 having the parallel sides thereof extending in the direction of movement of the articles and the closed end thereof disposed above the chute or vertical tube 11, as best shown in Fig. 1. The sides of the bracket 55 at the open end thereof beneath the clearing wheel 47 are provided with outwardly extending flanges 55a which overlie and are secured in any suitable manner (not shown) to the inner edges of the side walls 53.

The notches 48 in clearing wheel 47 are directly above the gap or space between the rollers 32 and 33 and cooperate therewith to clear the track of any articles that are not moving downward between the rollers in lengthwise positions. Hence, any articles on the track in a tilted or cocked position between the rollers 32 and 33 or resting crosswise of the latter or on top of properly positioned articles, are cleared from the track by the clearing wheel 47 which is adapted to be rotated rapidly, the blades or vanes thereof moving in a direction against the direction of movement of the articles on the track as they approach the latter. Such articles cleared from the track, along with articles tumbling from the guide plates 37 and 38 against the walls 53 at each side of the clearing wheel 47 and narrow open end of the bracket 55 therebetween, fall into the trough 16 and find their way back into the bottom of the feed drum 14.

The mechanism for driving the feed drum 14, rollers 32 and 33 and clearing wheel 47 just described comprises a main shaft 56 which is journaled in bearings 57 and 58 mounted on the casing 15, as shown in Fig. 3. To the main shaft 56 is fixed a sprocket wheel 57 about which passes an endless chain 58 which may be driven in any suitable manner, as by an electric motor (not shown), for example.

The mechanism for driving the feed drum 14 includes a pinion 59 fixed to the main shaft 56 which meshes with a beveled gear 60 fixed to a shaft 61 journaled in bearings 62 and 63, as shown in Figs. 1 and 3. To one end of the shaft 61 is fixed a pinion 64 which meshes with teeth 65 provided about the periphery of feed drum 14 adjacent to the annular ring 26 on which the feed drum is rotatably supported by one of two sets of rollers 28, as explained above.

As shown in Fig. 3, the rollers 32 and 33 are driven from the main shaft 56 by mechanism including a pair of sprocket wheels 66 and 67 fixed to the main shaft 56 and to a shaft 68, respectively, and about which passes an endless chain 69. The shaft 68 is journaled at one end at 69 in the housing 36 and adjacent the opposite end in a bearing 70 mounted in a side wall of the U-shaped shell 52. To the part of the shaft 68 disposed within the housing 36 are fixed two gears 71 which mesh with gears 72 fixed to the lower ends of the rollers 32 and 33, respectively.

As also shown in Fig. 3, the clearing wheel 47 is driven from the shaft 68 by a pair of pulley wheels 73 and 74 fixed to the shafts 68 and 49, respectively, and about which passes an endless belt 75. Hence, the rotation of the feed drum 14, the turning movement of the rollers 32 and 33 and the rotation of the clearing wheel 47, are all effected simultaneously from the single drive shaft 56.

When the articles in lengthwise positions between the rollers 32 and 33 pass through the clearing wheel 47, the articles are then caused to fall between the rollers and move downwardly toward the chute 11, each article during such downward movement being suspended from the rollers and held by the latter at an enlarged portion thereof. Thus, in handling elongated articles, such as cartridge cases, for example, each cartridge case 76 may be caused to fall between the rollers 32 and 33 and hang therefrom at the extreme closed end which is slightly greater in diameter than other parts of the article, as best shown in Fig. 7.

Figures 4, 5:
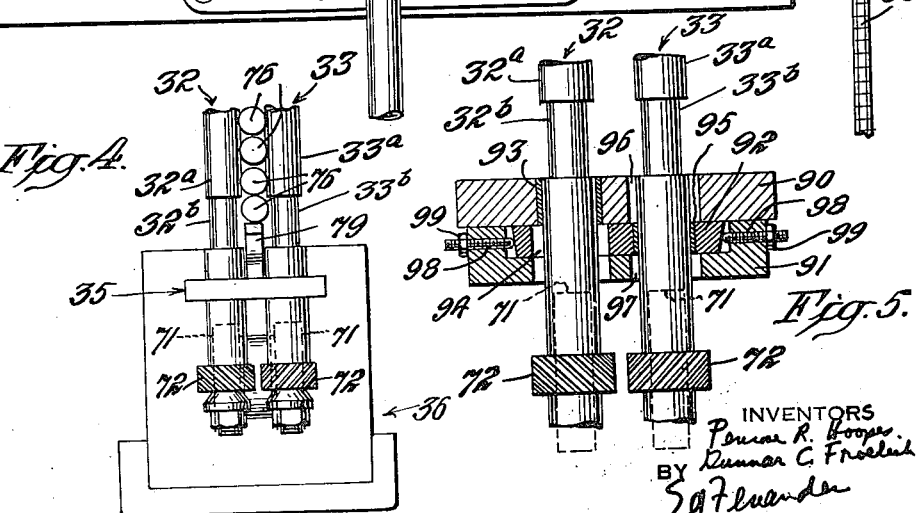
Fig. 4 is a fragmentary plan view, partly broken away and in section, of the front part of the apparatus above the chute or vertical tube to illustrate the manner in which the vertically suspended articles are released into the chute from the downwardly inclined track along which the articles move.
Fig. 5 is a fragmentary horizontal sectional view of a part of the apparatus shown in Fig. 4 to illustrate the adjustments provided for the inclined spaced apart rollers forming the track for the articles moving downwardly toward the chute.

In order to cause the articles to shift from lengthwise positions between the rollers 32 and 33 to the hanging positions illustrated in Fig 7, portions 32a and 33a of the rollers, which extend downwardly from the clearing wheel 47 and directly above the U-shaped guide bracket 55, are smaller in diameter than the portions of the rollers extending upwardly from the clearing wheel 47 through the feed drum 14. As best shown in Fig. 4, the gap or space between the reduced portions 32a and 33a of the rollers is such that the articles cannot freely fall therethrough but are maintained in upright or vertical positions with the enlarged closed ends thereof held between the rollers.

When a cartridge case 76 is disposed in a lengthwise position between the rollers 32 and 33 and the open end is leading as it passes through the clearing wheel 47, such open end of the cartridge case will immediately pass or swing downwardly between the rollers as the article moves onto the reduced portions 32a and 33a of the rollers. In Fig. 1 this swinging movement of the article into a vertically suspended position takes place in a counter-clockwise direction. When the trailing enlarged or closed end of the article moves onto the reduced portions 32a and 33a of the rollers, it is held between the latter to cause the article to ride down the track vertically suspended from its closed end.

When a cartridge case is disposed in a lengthwise position between the rollers 32 and 33 and the closed end is leading as it passes through the clearing wheel 47, such closed end will continue to be held and supported between the reduced portions 32a and 33a of the rollers as the article passes onto this portion of the track. When the trailing open end of the article finally passes from the portions of the rollers 32 and 33 of greater diameter onto the portions 32a and 33a of reduced diameter, the open end of the article immediately falls or swings downwardly between the rollers and the article will then ride down the track supported on the rollers at the enlarged end thereof. In Fig. 1 such swinging movement of an article into a vertically suspended position takes place in a clockwise direction.

In many instances the elongated articles are of such shape that the enlarged portions are only slightly greater in diameter than other parts of the articles. This is especially true of articles like the cartridge cases 76 in which the closed ends or heads are only a few thousandths of an inch greater in diameter than other parts of the articles. In such case the clearance provided between the reduced portions 32a and 33a of the rollers, to permit the articles to pass therebetween and still hold the enlarged portions thereof on the rollers, is relatively small. In the event an article is slightly tilted or cocked between the reduced portions 32a and 33a of the rollers in a plane transverse thereto as it falls or swings into a vertical position therebetween, there is a tendency for the rollers to grip the article and impart a sharp upward thrust thereto. This is so because, as previously pointed out, the rollers 32 and 33 rotate in such a manner that the opposing sides or inside faces thereof both move upwardly, as indicated by the arrows in Fig. 2.

To prevent unrestricted upward movement being imparted to the articles as they swing or fall into vertical positions between the rollers, a guide plate 77 is provided above the gap between the rollers adjacent to the clearing wheel 47. The guide plate 77 is positioned as closely as possible to the clearing wheel 47 and is notched at its upper end at 78 to provide clearance for the blades or vanes of the clearing wheel. In the event an article is thrown upwardly as it falls between the reduced portions 32a and 33a of the rollers, it strikes the guide plate 77 and falls back between the rollers.

Since articles are falling between the reduced portions 32a and 33a of the rollers in rapid succession, an article after striking the guide plate 77 usually is thrown down and tends to pass readily through the rollers. Further, the tendency for articles to be thrown upwardly by the rollers is reduced by providing the vertically disposed U-shaped guide bracket 55 below the track, the side walls of which extend lengthwise of the reduced portions 32a and 33a of the rollers. The guide bracket 55 provides a narrow trough into which the lower ends of the articles fall. Immediately after the lower end of an article enters the top edge of the trough, lateral swaying of the article is prevented and any tendency for the article to tilt or cock is minimized, so that the articles are not readily gripped by the rollers and thrown upwardly.

It will now be understood that the narrow reduced portions 32a and 33a of the rollers provides a simple arrangement for properly orienting the articles whereby the articles, irrespective of the direction in which each first moves downwardly on the track in a lengthwise position, are properly oriented for movement in the reduced portions 32a and 33a of the rollers, the identical end of each article being pointed down as it is vertically suspended from an enlarged portion thereof held between the rollers.

Directly above the closed end wall 54 of the guide bracket 55 the rollers 32 and 33 forming the track are further reduced in diameter, as indicated at 32b and 33b in Figs. 1 and 4. The reduced sections 32b and 33b of the rollers are relatively short in length and the gap or space therebetween is sufficiently large to release the articles from the track, as shown in Fig. 8, and permit them to fall by gravity between the rollers and slide down the lower or closed end wall 54 of guide bracket 55.

At the instant an article is released in the reduced sections 32b and 33b of the rollers, the vertically disposed articles directly behind it are still held at their enlarged ends by the reduced portions 32a and 33a of the rollers. In order to insure each article falling freely by gravity when it reaches the reduced sections 32b and 33b of the rollers, and to minimize any tendency for the succeeding vertically suspended articles to hold the released article stationary against the lower end wall 54 of the guide bracket 55, an agitator or reciprocating finger 79 is provided at the bottom of the track in the gap between the reduced sections 32b and 33b of the rollers.

The agitator 79 is adapted to reciprocate and move back and forth longitudinally of the track whereby a group of articles vertically suspended on the track is intermittently pushed upwardly in the reduced portions 32a and 33a of the rollers on each upward stroke of the agitator. On the downward strokes of the agitator 79 the vertically suspended article in the lowermost position on the track immediately moves into the reduced sections 32b and 33b of the rollers and is released therefrom and passes into the upper end of the chute 11 before the group of vertically suspended articles behind it is effective to hold the released article against the lower end wall 54 of the guide bracket 55 or retard downward travel thereof.

As shown most clearly in Fig. 1, the agitator or finger 79 projecting upwardly through the gap between the reduced sections 32b and 33b of the rollers is formed at the upper end of an L-shaped lever 80 pivoted at 81 in the housing 36. A reciprocating movement is imparted to lever 80 by mechanism including a cam 82 fixed to the shaft 68 adjacent to one of the gears 71 within the housing 36. The cam 82 is provided with an indent 83 at the peripheral surface thereof against which is adapted to bear a rounded end of a plunger 84 adjustably secured at its lower end at 85 to the short arm of the lever 80. The plunger 84 is forceably pressed against the periphery of the cam 82 by a spring 86 held under compression within a hollow sleeve 87 having the closed end thereof adapted to press against the long arm of the lever 80.

During the major portion of each revolution of the shaft 68 the plunger 84 bears against the smooth peripheral surface of the cam 82 and the agitator or finger 79 is held in its lower position. In such lower position of the finger 79 the face thereof acting against the articles is directly above and in alignment with the slide formed by the lower end wall 54 of the guide bracket 55. When the indent 83 of the cam passes the plunger 84, the plunger is immediately raised by the action of the spring 86, thereby causing the lever 80 to swing about the pivot 81 in a clockwise direction, as seen in Fig. 1. This causes the finger 79 to move upwardly along the track to push back the articles held in suspended vertical positions in the reduced portions 32a and 33a of the rollers.

This upward movement of the finger 79 is in the nature of a sharp upward thrust, and, since the indent 83 on the cam 82 is relatively short, the plunger 84 practically immediately moves downwardly against the action of the spring 86 and causes the finger 79 to move downwardly and return instantaneously to its lower position directly above the lower end wall 54 of the guide bracket 55. In this way the lowermost article on the track, upon the quick upward thrust of the finger 79 and subsequent return stroke which takes place practically instantaneously, is enabled to pull away quickly by gravity from the succeeding vertically suspended articles directly behind it and release itself from the reduced sections 32b and 33b of the rollers before such succeeding articles are effective to fall upon the lowermost article and tend to retard its downward movement or lock it against the lower end wall 54 of the guide bracket 55.

Not only does the movable finger 79 insure the prompt release of each article when it is about to fall from the inclined track at the reduced sections 32b and 33b of the rollers, but it also eliminates slowing down of the articles as they travel down the track and pass into the chute or tube 11. The stroke or distance the finger 79 moves is not very great and just sufficient to facilitate the release of the articles from the track in the manner just described.

The slide formed by the lower end wall 54 of the hollow guide bracket 55 is in effect an extension of the chute into which the articles are first released from the track. Below the guide bracket 55 the shell 52 is provided with an opening 88 which is flared at its upper end to facilitate the entry of articles therein from the slide. To the opening 88 is fixed the upper end of the tube 11 which is also connected at an intermediate region at 89 to the casing 15. To facilitate and insure prompt release of each article from the track, the upper part of the chute formed by the slide or lower end wall 54 of the guide bracket 55 is at a right angle and perpendicular to the axes of the rollers 32 and 33.

This arrangement of the upper part of the chute at a right angle to the inclined track, together with the provision of the movable finger 79, also possesses an additional advantage which speeds up the handling of the articles. After the return movement of the finger 79 back to its lower position which enables the lowermost article on the rollers 32a and 32b to free itself readily from the inclined track, as described above, the succeeding articles behind the released article about to pass into the chute or tube 11 fall on top of the released article. In the arrangement provided, the article 76 directly behind the released article acts on the latter somewhat as diagrammatically illustrated in Fig. 12.

In Fig. 12 the article directly behind the released article at the slide 54 is canted or tilted and the top part thereof overlies the released article. An intermediate region of the tilted article acts on the top enlarged end of the released article and imparts a downward push or shove to the released article to speed up its downward movement through the chute or vertical tube 11. Hence, the foremost article of the group of articles behind the released article acts on the latter in such a manner that a downward component of force is imparted to the released article to initiate movement of the article about to enter the upper end of the tube 11.

It will be seen that no positive mechanical connection is provided to cause back and forth movement of the lever 80 carrying the finger 79, but that the finger is biased to its upper position by the action of the spring 86. Hence, in the event any jamming of articles should occur at the lower end of the track tending to prevent upward movement of the finger 79, the spring 86 is simply rendered ineffective to cause the finger to move upwardly and remains under compression, even when the cam plunger 84 is able to enter the cam indent 83 and does not do so because of the jammed condition, whereby no parts of the mechanism are forced and injury thereof is prevented.

It has been previously stated that the rollers 32 and 33 are journaled at their ends at 34 and 35, respectively. In order to adjust the gap or distance between the rollers 32 and 33, adjustable bearing slides are embodied at each of these regions. Such an adjustable bearing slide may be like that diagrammatically shown in Fig. 5 and includes a pair of walls 90 and 91 between which is held a transversely movable wall or bearing slide 92, one of the walls 91 being U-shaped in section and having the ends thereof overlying the edges of the movable slide 92 and butting a face of the wall 90.

One of the rollers 32 is journalled at 93 in the wall 90 and passes through enlarged aligned openings formed in the slide 92 and wall 91, as indicated at 94 in Fig. 5. The other roller 33 is journaled at 95 in the bearing slide 92 and passes through enlarged openings 96 and 97, respectively, in the walls 90 and 91. The ends of the wall 91 threadedly receive screws 98 having rounded inner ends acting against the beveled or inclined edges of the slide 92, and lock nuts 99 are provided on the screws 98 to keep the slide 92 in any position to which it is adjusted. By transversely moving the bearing slide 92 in which only the roller 33 is journaled, the latter may be shifted and adjusted with respect to the roller 32 to adjust the gap or space between the rollers.

While the adjustable bearing slide just described is associated with the lower end of the rollers 32 and 33 and embodied in the housing 36, it will be understood that a similar bearing slide is incorporated at 34 at the upper ends of the rollers, whereby the rollers may be properly aligned and adjusted with respect to each other so that the articles will assume a lengthwise position therebetween when the articles are first deposited on the rollers from the feed drum 14, as shown in Fig. 6. Further, the adjustment of the rollers 32 and 33 is such that the articles are properly oriented and hang vertically at the enlarged ends thereof between the reduced portions 32a and 33a of the rollers, as shown in Fig. 7. In addition, the adjustment of the rollers is such that the articles are readily released from the reduced sections 32b and 33b of the rollers, as indicated in Fig. 8.

In order to make certain that the shoulders formed on the rollers 32 and 33 at the upper and lower ends of the reduced portions 32a and 33a thereof are in accurate transverse alignment, adjusting screws 100 are provided at the upper and lower ends of the rollers, whereby each roller may be axially moved up and down independently of the other, the gearing in the housing 36 having sufficient clearance to permit such axial adjustment of the rollers without adversely affecting the driving mechanism for the rollers. As best shown in Fig. 1, the adjusting screws 100 are formed with rounded inner ends which bear against the extreme ends of the rollers 32 and 33 and may be securely maintained in any position to which they are adjusted by lock nuts 101.

In handling open-ended elongated articles, such as the cartridge cases 76, for example, a condition sometimes occurs in which the open ends of two articles interlock, as shown in Fig. 14, and such articles in this jammed condition are deposited in lengthwise positions between the rollers 32 and 33 at a region above the clearing wheel 47. The notches 48 in the clearing wheel 47 often permit such interlocked articles to pass through the latter onto the reduced portions 32a and 33a of the rollers.

When an article passes onto the reduced portions 32a and 33a with its open end trailing the closed end and the open end is free, the article swings into a vertically suspended position when the open end finally passes onto the reduced roller portions 32a and 33a, as described above. However, when the trailing open end of an article is interlocked with the open leading end of a succeeding article, as shown in Fig. 14, the first or leading jammed article does not swing into a vertically suspended position on the reduced roller portions 32a and 33a and continues to move downwardly on the latter until the closed or enlarged end thereof reaches the reduced sections 32b and 33b of the rollers. When this occurs, the closed or enlarged end of the leading jammed articles is free to pass through the gap or space between the reduced sections 32b and 33b of the rollers at which time the leading jammed article frees itself from the trailing jammed article.

When the jammed or interlocked articles are thus separated, the trailing jammed article immediately swings into a vertically suspended position on the reduced portions 32a and 33a of the rollers, in the manner previously described. However, the separation of the jammed articles is effected at the expense of the leading jammed article which is not properly oriented and moves on the slide or lower end wall 54 of the bracket 55 into the chute or tube 11 with the closed end thereof pointed down. In order to prevent articles passing down the chute improperly oriented, especially articles jammed or interlocked in the manner illustrated in Fig. 14, suitable provision is made to separate the jammed articles and insure properly orientation of each article on the reduced portions 32a and 33a of the rollers before the articles are released from the inclined track into the chute or tube 11.

The mechanism provided to separate jammed articles interlocked at their open ends includes a stop 102 which, as best shown in Figs. 1 and 7, is positioned in the gap between the reduced portions 32a and 33a of the rollers and at such an elevation that articles will clear the stop only when hanging in vertically suspended positions at the enlarged ends thereof. As diagrammatically shown in Figs. 9, 10 and 11, the stop 102 comprises a pin which is fixed to a slide 103 and projects downwardly from the underside thereof through an elongated opening 104 in a cover 105.

In order to hold the slide 103 on the cover 105 and permit relative movement therebetween, the slide is formed with a pair of elongated openings 106 through which pass studs 107 fixed at their lower ends in the cover 105. It will now be apparent that the elongated openings 106, through which the holding studs 107 pass, permit movement of the slide 103 on the cover 105, and that the stop 102 moves in the elongated opening 104 in the cover 105.

As best shown in Fig. 1, the cover 105 is disposed adjacent to the guide plate 77 and overlies the reduced portions 32a and 33a of the rollers. The end of the cover 105 adjacent to the guide plate 77 is rounded and curved at its underside and cooperates with the guide plate to hold back articles which may be thrown upwardly by the rollers as the articles swing from lengthwise positions into vertically suspended positions between the rollers. In addition, the cover 105 at its upper end serves to guide and direct articles into such a lengthwise position between the reduced portions 32a and 33a of the rollers that swinging movement of the articles into vertically suspended positions is facilitated.

In Fig. 1 the cover 105 is provided with a pair of spaced apart upwardly extending side arms pivoted at 108 to a plate 119 on the housing 36. The plate 119 is formed with an opening to receive a stud 120 for mounting the plate on the housing 36, the opening being elongated to permit adjustment of the stop 102 lengthwise of the reduced portions 32a and 33a of the rollers. The cover 105 is also provided with an upwardly extending handle 109, whereby the cover may be manually raised about the pivot 108 to gain access to the reduced portions 32a and 33a and 32b and 33b of the rollers.

The cover 105 is so positioned above the rollers that the narrow reduced end of the slide 103 in its lower position engages the extreme upward end of the finger 79 when the latter is at its lower position. When the finger 79 is caused to move upward the slide 103 also moves upward, thereby moving the stop 102 toward the clearing wheel 47. The slide 103 may be spring biased to return the stop 102 to its lower position when the finger 79 returns to its lower position. As diagrammatically shown in Fig. 9, this may be accomplished by providing a spring 110 connected at one end to the slide 103 and at its opposite end to a fixed support 111, as to the arm which is pivotally connected at its upper end at 108, for example.

The stop 102 is positioned such a distance from the upper end of the reduced roller portions 32a and 33a that articles passing onto the latter in lengthwise positions between the rollers, and having the open ends trailing the closed or head ends, can freely swing into vertically suspended positions and pass under the stop 102, as shown in Fig. 7. However, when a pair of articles is jammed in such a manner that the open ends thereof are interlocked, the stop 102 will act against the closed end of the leading article, as diagrammatically illustrated in Fig. 14.

It has already been pointed out that the finger 79 moves upward during a portion of each revolution of the cam 82 to impart a sharp upward thrust against the articles in vertically suspended positions at the reduced portions 32a and 33a of the rollers. After each upward stroke of the finger 79 it returns practically immediately to its lower position to facilitate the release of the lowermost vertically suspended article from the inclined track.

Since the upper end of the finger 79 engages the narrow tab of the slide 103, the latter is also moved upward intermittently, thereby causing the stop 102 to move back and forth in the gap between the reduced portions 32a and 33a of the rollers. When the stop 102 engages the head or closed end of two articles in the jammed condition diagrammatically illustrated in Fig. 14, and the stop suddenly moves toward the clearing wheel 47 in the same manner as the pin 79, a sharp blow is imparted to the leading jammed article causing the trailing jammed article to be thrown from and separated from the leading article.

When this occurs the now free open end of the leading article can immediately swing into a vertically suspended position and pass under the stop 102 which only a moment before was holding back the leading article because its trailing open end was interlocked with the open end of a succeeding article. Likewise, since the trailing jammed article is free of the leading jammed article, it can also swing into a vertically suspended position between the reduced portions 32a and 33a of the rollers. Hence, by the provision of the movable stop 102 and operating mechanism therefor, all of the articles passing onto the reduced portions 32a and 33a of the rollers, including jammed articles interlocked at their open ends, are properly oriented and caused to move between the reduced roller portions so that each article will be suspended from the track at the enlarged upper end thereof, whereby a maximum number of articles will pass into the chute or tube 11 in a given length of time, each article passing downwardly in the chute having its open end pointed down.

In the embodiment of the invention just described, the reduced portions 32a and 33a of the rollers are spaced apart such a distance that the cartridge cases 76 in vertically suspended positions are held on the rollers at shoulders 112 formed at the closed or head ends of the elongated cases. While the cases 76 can be satisfactorily supported in this way, the shape of the cases 76 is such that they may also be supported just below the closed or head ends in the manner diagrammatically shown in Fig. 13. This is so because the cartridge cases 76 are tapered very slightly from regions 113 just below the shoulders 112 toward the open ends 114 thereof, each article being a few thousandths of an inch greater in diameter at the shoulder 112 than at the widest region 113 of the tapered portion which extends to the open end of the article.

When the gap or space between the reduced portions 32a and 33a of the rollers is adjusted to hold the articles in vertically suspended positions at the regions 113 thereof directly beneath the shoulders 112, the vertically suspended articles ride at a higher level in the inclined track than in the embodiment just described in which the articles ride on the shoulders 112. Hence, when the movable stop is employed to relieve a jammed condition like that shown in Fig. 14, the stop extends below the closed ends or heads of the articles moving on the inclined track in vertically suspended positions.

In order to relieve jamming of articles with the aid of a movable stop extending below the closed ends of vertically suspended articles, provision may be made to cause the properly oriented vertically suspended articles to move the stop out of the path of movement of such articles. As diagrammatically shown in Figs. 15 and 16 in which parts similar to those illustrated in Figs. 9 to 11 are illustrated by the same reference numerals, such a stop 102a may comprise a pin projecting through openings formed in a slide 103a and a cover 105a, as indicated at 104a. The slide 103a is spring biased to its lower position and fixed to and movable on the cover 105a in the same manner as shown in Figs. 9 to 11 and previously described.

The stop 102a is fixed to one end of a lever or arm 115 resting upon the slide 103a and pivoted thereto at its opposite end at 116. When the slide 103a moves back and forth lengthwise of the cover 105a, the stop 102a projecting through the opening 104a moves lengthwise of the reduced portions 32a and 33a of the rollers. In addition, the stop 102a is movable transversely of the slide 103a and cover 105a, by reason of its association with the pivotally connected arm 115, and is resiliently biased to the position shown in Fig. 15 by a curved leaf spring 117 having one end bearing and pressing against the arm 115 and the opposite end fixed at 118 to the slide 103a.

When the stop 102a is spring biased to the position shown in Fig. 15, it is closer to one of the rollers than to the other, as shown in Fig. 13. Each time a vertically suspended article engages the stop 102a, the latter is deflected out of the path of movement of the article against the action of the leaf spring 117. As soon as a vertically suspended articles passes the stop 102a, the leaf spring is effective to return the stop to the inner side of the opening 104a. By positioning the stop 102a so that side regions rather than extreme forward regions of properly suspended articles engage the stop, a sidewise or lateral movement is readily imparted to the stop 102a to push it to one side of properly suspended articles traveling down the inclined track.

When the closed ends of a pair of jammed articles contacts the stop 102a, the latter is held against the inner surface of the opening 104a by reason of the position of the pivot 116 of the arm 115 and the fact that the stop is not readily deflected sidewise by the closed end of an article disposed in a lengthwise position between the rollers. Under these conditions, upward movement of the stop 102a toward the clearing wheel 47, which is effected by the movable finger 79, imparts a sharp upward thrust or blow to the jammed articles to cause separation of the interlocked open ends, in the same manner explained above in describing the purpose and operation of the stop 102 in the embodiment of Figs. 9 to 11 inclusive.

The embodiment of the invention just described incorporates many improvements to speed up the handling and feeding of articles initially deposited in a haphazard manner in the hopper 10 and subsequently fed at an exceptionally rapid rate down the chute 11 in end to end relation in an orderly sequence. In apparatus built for handling caliber .30 cartridge cases and from which the drawings were made, the apparatus is capable of feeding such cartridge cases down the chute 11 at the rate of about 140 per minute. Although the apparatus is capable of releasing cartridge cases at the reduced sections 32b and 33b of the rollers at the rate of nearly 200 per minute when the cartridge cases fall freely from the track, the friction encountered in discharging the cartridge cases through the chute slows down the feeding rate to that just mentioned.

To attain this high feeding rate of articles in the chute 11 the feed drum 14 is driven at such a speed that the articles carried upwardly in the grooves 31 and delivered to the upper ends of the rollers 32 and 33 tend to pile up at this region. While each groove 31 can pick up a maximum of three cartridge cases, the average number of cases picked up by each groove in actual practice is about one and one half cases.

The grooves 31 formed by the ribs 30 extend lengthwise of the rollers 32 and 33 and the articles tend to fall from the grooves extending in directions generally lengthwise of the track. By carrying the elongated articles from a first level at the bottom of the feed drum to a higher level above the track and causing the articles to cascade from the grooves onto the rollers 32 and 33 in the manner just described, the depositing of the falling articles in lengthwise positions on the track is promoted. The depositing of the articles in lengthwise positions on the track is further promoted and facilitated by the provision of the guide plates 37 and 38 at each side of the rollers 32 and 33.

The movable plate 22 at the bottom of the hopper 10 is adjusted to such a position beneath the wall 21 that articles will fall by gravity at the desired rate from the hopper 10 into the feed drum 14 to keep the bottom part of the drum filled with articles while they are continuously being delivered therefrom to a place at a higher level above the uppermost region of the track which is partially enclosed by the guide plates 37 and 38 and upper part of the feed drum 14. While a considerable number of articles fall from the guide plates 37 and 38 back into the mass of articles tumbling in the bottom of the feed drum, the arrangement provided for depositing the articles in lengthwise positions on the rollers 32 and 33 is such that a continuous stream of articles, closely adjacent to one another in end to end relation, normally moves down the track with the aid of gravity, such downward movement being imparted to the articles by the turning of the rollers 32 and 33.

The clearing wheel 47 turns quite rapidly to clear the track of articles moving downwardly thereon that are not disposed in lengthwise positions between the rollers 32 and 33. Such articles turned back by the clearing wheel 47, together with the articles passing from the guide plates 37 and 38, fall into the trough 16 and from the latter into the bottom of the feed drum 14, as previously explained. To facilitate downward movement of the articles from the trough 16 and hopper 10 into the feed drum 14, the latter is positioned so that the lower ends of the sloping bottoms 12 and 17 of the hopper and trough, respectively, are about at the same level as the tips or inner edges of the ribs 30 as they pass through their lowermost positions during rotation of the feed drum, as shown most clearly in Fig. 1.

By preventing improperly positioned articles passing onto the reduced portions 32a and 33a of the rollers, the shifting of the articles from lengthwise positions to vertically suspended positions on the track is facilitated and not needlessly hampered by articles falling and cascading onto the reduced roller portions from other parts of the apparatus. This is important when it is considered that in the apparatus built and referred to above the rollers 32 and 33 each turn at a speed of about 450 R. P. M.

In order to cause an optimum number of articles deposited in lengthwise positions on the track to travel down the chute 11, several important features are embodied in the apparatus. Thus, the inclined track formed by the elongated rollers is of such character that, irrespective of which ends of the articles are leading as they move downwardly in lengthwise positions past the clearing wheel 47, all of the articles are properly oriented at the reduced portions 32a and 33a of the rollers, whereby similar or identical ends of the articles are pointed down when they swing into vertically suspended positions between the rollers.

In feeding articles like the cartridge cases 76, for example, the cases may be supported in vertically suspended positions either at the shoulders 112 or at the widest regions 113 of the tapered portions beneath the shoulders. In any event, in handling and feeding articles each of which is more or less cylindrical-shaped and having one region of slightly greater diameter than other points between such region and one end of the articles, each article is free to swing into a vertical position and be supported at the region of greater diameter, the center of gravity of each article being between the region at which it is supported and the one end which is pointed down.

Further, at the reduced portions 32a and 33a of the rollers provision is made to prevent the loss of properly positioned articles on the track due to the tendency for articles sometimes to be gripped between the rollers and thrown upwardly as they shift from lengthwise positions to vertically suspended positions on the track. This is particularly true when the clearance for the articles between the rollers is very small and only a matter of a few thousandths of an inch. In such cases, when the article is slightly tilted in a plane transverse to the axes of the rollers as it passes downwardly therebetween, the article may be gripped by the rollers and thrown upwardly because the rollers are rotated in such directions that the opposing sides or inner faces thereof are both moving upwardly. To prevent loss of articles from the track in this manner, the guide plate 77 is provided immediately above the intermediate reduced sections of the rollers, as previously explained, to limit upward movement of any articles gripped and acted upon by the rollers. Since the lower ends of articles striking the guide plate 77 are still between the rollers, there is a tendency for the lifted articles to straighten out and fall by gravity between the rollers when acted upon by the guide plate. The cover 105 associated with the stop 102 also cooperates with the guide plate 77 to prevent loss of articles from the track in the event articles should be thrown upwardly therefrom.

The finger 79 at the lower end of the track, at the reduced sections 32b and 33b of the rollers, also promotes feeding of the articles at a rapid rate into the chute. The finger 79, which may be referred to as an agitator and reciprocates back and forth at the region of the track at which the articles are released therefrom, eliminates slowing down of the articles and quickly frees each article as it it released from the reduced sections of the rollers, as explained above. In addition, by releasing the articles from the track onto the slide 54 which is substantially perpendicular to the axes of the rollers, a downward component of force is imparted to each released article by the article or articles directly behind it, as diagrammatically illustrated in Fig. 12 and previously explained.

Even when articles are jammed at the open ends thereof, as shown in Fig. 14, loss of such articles from the track is avoided and each such jammed article is eventually caused to pass into the chute 11 properly oriented. As already explained, this is accomplished by providing the stops 102 or 102a which reciprocate and separate the jammed articles at the reduced sections 32a and 32b of the rollers, whereby each separated article may be properly oriented in a vertically suspended position before being released from the track into the chute.

In view of the foregoing, it will now be understood that we have provided an improved apparatus for handling articles from a bulk supply in which the articles are haphazardly deposited and for feeding such articles at a rapid rate in a downwardly extending path in end to end relation, the articles being properly oriented for downward travel in the path. Although we have shown a preferred embodiment of the improved article handling apparatus for handling cartridge cases, we do not wish to be limited to handling and feeding such articles and to the particular arrangements set forth, it being obvious to those skilled in the art that various changes and modifications may be made, and that certain features may be employed independently of others, without departing from the spirit and scope of our invention. We therefore aim in the following claims to cover all such modifications and changes as fall within the true spirit and scope of our invention.

What is claimed is:

1. In article handling apparatus, mechanism providing an inclined path of movement for the articles, said mechanism being constructed and arranged to cause movement of the articles along said path with the aid of gravity and including means to receive and support the articles in vertically suspended positions at one region of the path of movement and to release the vertically suspended articles during downward movement thereof from the one region to another lower region of the path of movement for gravitational lengthwise travel in a downwardly extending chute, and mechanism for intermittently imparting a thrust against the lowermost articles at the lower region of said path in a direction opposite to that of the downward movement of the articles to facilitate the release of the articles at the lower region.

2. In apparatus for handling elongated articles, mechanism providing an inclined path of movement for the articles, said mechanism being constructed and arranged to cause downward movement of the articles along said path with the aid of gravity and including means to receive and support the articles in vertically suspended positions at one region of the path of movement and to release the articles during downward movement thereof from the one region to another lower region of the path of movement for gravitational lengthwise travel in a chute, and means including an intermittently operated movable member for momentarily lifting the lowermost articles upwardly in the path of movement in a direction opposing the normal downward travel of the articles to facilitate the release of the articles at the lower region of the path of movement.

3. In apparatus for feeding elongated articles open at least at one end thereof, mechanism providing an inclined path of movement for the articles, means to deposit articles onto the path of movement at a first region thereof without regard to the precise position the articles take thereon, said mechanism including a pair of elongated members and means to rotate said members to cause downward movement of the articles along said inclined path with the aid of gravity, said members being spaced for first receiving and supporting the articles thereon in lengthwise positions at the first region and being spaced so that the articles at a second region of the path of movement shift from the lengthwise positions, irrespective of which ends are leading, to vertically suspended positions having similar ends pointed down to orient the articles and being spaced to thereafter release the articles at a third region of the path of movement, and reciprocating means at the second region of the path of movement to engage articles still in lengthwise position to separate a pair of articles jammed at their open ends and moving in lengthwise positions in said path from the first region.

4. In apparatus for feeding cylindrical-shaped articles each having one region of greater diameter than other points between said region and one end thereof and having the center of gravity between said region and said one end whereby the articles may be vertically suspended from said region having the one end pointed down, the combination of an inclined track including a pair of elongated rollers disposed alongside of each other, means to turn said rollers to cause articles deposited thereon to move down the track with the aid of gravity, said rollers having three aligned sections of successively smaller diameters whereby the gap between the roller sections at the highest level is smallest and that between the roller sections at the lowest level is greatest, the gap between the roller sections at the highest level being such that the articles deposited thereon are supported in lengthwise positions therebetween, the gap betwen the roller sections at the intermediate level being such that the articles moving thereon from the roller sections at the highest level swing from lengthwise positions, irrespective of which ends are leading, to vertically suspended positions in which the articles are supported at said regions having the one end pointed down, and the gap between the roller sections at the lowest level being sufficiently large to permit the release of the articles from the track into a chute when they pass from the intermediate to the lowest roller sections, said articles being open at least at one end and reciprocating means at the roller sections at the intermediate level to separate a pair of articles jammed at their open ends and traveling in lengthwise positions onto the roller sections at the intermediate level, whereby each of such jammed articles after separation thereof is effected shifts to a vertically suspended position having the one end thereof pointed down.

5. In apparatus for feeding cylindrical-shaped articles each having one region of greater diameter than other points between said region and one end thereof and having the center of gravity between said region and said one end whereby the articles may be vertically suspended from said region having the one end pointed down, the combination of an inclined track including a pair of elongated rollers disposed alongside of each other, means to turn said rollers to cause articles deposited thereon to move down the track with the aid of gravity, said rollers having three aligned sections of successively smaller diameters whereby the gap between the roller sections at the highest level is smallest and that between the roller sections at the lowest level is greatest, the gap between the roller sctions at the highest level being such that the articles deposited thereon are supported in lengthwise positions therebetween, the gap between the roller sections at the intermediate level being such that the articles moving thereon from the roller sections at the highest level swing from lengthwise positions, irrespective of which ends are leading, to vertically suspended positions in which the articles are supported at said regions having the one end pointed down, and the gap between the roller sections at the lowest level being sufficiently large to permit the release of the articles from the track into a chute when they pass from the intermediate to the lowest roller sections, and an intermittently movable member in the path of movement of the articles at the roller sections at the lowest level arranged to prevent jamming of the vertically suspended articles and facilitate the release of the lowermost articles from the track into the chute.

PENROSE R. HOOPES.
GUNNAR C. FROELICH.

REFERENCES CITED

The following references are of record in the file of this patent:

UNITED STATES PATENTS

| Number | Name | Date |
|---|---|---|
| 989,348 | Haines | Apr. 11, 1911 |
| 1,336,785 | Matter et al. | Apr. 13, 1920 |
| 1,476,064 | Eynon | Dec. 4, 1923 |
| 2,060,182 | Dellaree | Nov. 10, 1936 |
| 2,075,050 | Nowinski | Mar. 30, 1937 |
| 2,088,117 | Rehnberg | July 27, 1937 |
| 2,324,246 | Thompson et al. | July 13, 1943 |
| 2,341,373 | Gantzer | Feb. 8, 1944 |
| 2,355,158 | Harris et al. | Aug. 8, 1944 |
| 2,366,256 | Harris et al. | Jan. 2, 1945 |
| 2,377,154 | Hurley | May 29, 1945 |
| 2,381,893 | Fernald | Aug. 14, 1945 |
| 2,392,509 | Sells | Jan. 8, 1946 |
| 2,403,862 | Lakso | July 9, 1946 |
| 2,404,480 | Fernald | July 23, 1946 |